United States Patent
Tang

(10) Patent No.: US 10,952,136 B2
(45) Date of Patent: Mar. 16, 2021

(54) CELL SEARCH METHOD AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/878,216

(22) Filed: May 19, 2020

(65) Prior Publication Data

US 2020/0280916 A1 Sep. 3, 2020

Related U.S. Application Data

(63) Continuation of application No. PCT/CN2018/074493, filed on Jan. 29, 2018.

(51) Int. Cl.
*H04W 48/20* (2009.01)
*H04W 52/02* (2009.01)

(52) U.S. Cl.
CPC ....... *H04W 48/20* (2013.01); *H04W 52/0212* (2013.01)

(58) Field of Classification Search
CPC . H04W 36/04; H04W 36/08; H04W 36/0038; H04W 36/0088; H04W 48/00; H04W 48/20; H04W 76/27; H04W 76/28
USPC ................................................ 455/435.2, 515
See application file for complete search history.

(56) References Cited

U.S. PATENT DOCUMENTS

| 2019/0268963 A1* | 8/2019 | Kim ...................... H04W 76/27 |
| 2019/0319686 A1* | 10/2019 | Chen, IV ............ H04W 72/046 |
| 2020/0053821 A1* | 2/2020 | Shih ...................... H04W 76/27 |

FOREIGN PATENT DOCUMENTS

| CN | 102149097 A | 8/2011 |
| CN | 106658758 A | 5/2017 |
| EP | 2993944 A1 | 3/2016 |
| RU | 2449507 C2 | 4/2012 |

(Continued)

OTHER PUBLICATIONS

International Search Report dated Aug. 1, 2018 of PCT/CN2018/074493 (2 pages).

(Continued)

*Primary Examiner* — Lee Nguyen
(74) *Attorney, Agent, or Firm* — Perkins Coie LLP

(57) ABSTRACT

Provided are a cell search method and a terminal device. The method is applied to a terminal device in an inactive state, wherein the inactive state indicates that the terminal device is disconnected from a network device, and the network device and the terminal device both retain contextual information of the terminal device, the contextual information being used for establishing a connection between the terminal device and the network device. The method comprises: when no suitable cell is found for camping, a terminal device entering an arbitrary cell search state to search for an acceptable cell and/or a suitable cell. In the implementations of the present disclosure, when no suitable cell is found for camping, a terminal device in an inactive state searches for an acceptable cell and/or a suitable cell by means of entering an arbitrary cell search state.

28 Claims, 1 Drawing Sheet

(56) References Cited

FOREIGN PATENT DOCUMENTS

RU       2605358 C2    12/2016
WO    2018017840 A1     1/2018

OTHER PUBLICATIONS

3GPP TSG-RAN WG2 meeting #99bis, Prague, Czech Republic, Oct. 9-13, 2017—R2-1710001—ETSI MCC, Report of 3GPP TSG RAN2#99 meeting, Berlin, Germany (235 pages).
3GPP TS 36.304 V14.0.0 (Sep. 2016) (Technical Specification)—3rd Generation Partnership Project; Technical Specification Group Radio Access Network; Technical Specification Group Radio Access Network; Universal Terrestrial Radio Access (E-UTRA); User Equipment (UE) procedures in idle mode (Release 14) (46 pages).
3GPP TSG-RAN WG2 #97—Athens, Greece Feb. 13-17, 2017—R2-1701189—InterDigital Communications, State Transition from Inactive to Idle for NR (3 pages).
First Examination Report of Australian Patent Application No. 2018404498 dated Dec. 18, 2020 (5 pages).
Office Action of Russian Patent Application No. 2020125046 dated Oct. 28, 2020 (9 pages).
Supplementary European Search Report of European Patent Application No. 18902818.6 (10 pages). dated Nov. 20, 2020.

\* cited by examiner

CELL SEARCH METHOD AND TERMINAL DEVICE

CROSS-REFERENCE TO RELATED APPLICATION

This application is a continuation application of International Application No. PCT/CN2018/074493 filed on Jan. 29, 2018, of which the entire disclosure is hereby incorporated by reference.

TECHNICAL FIELD

Implementations of the present disclosure relate to the communication field, and more particularly, to a cell search method and a terminal device.

BACKGROUND

With people's pursuit of rate, latency, high-speed mobility and energy efficiency, and due to diversity and complexity of services in future life, International Standards Organization of 3rd Generation Partnership Project (3GPP) began to research and develop a 5-Generation mobile communication technology (5G). To reduce air interface signaling, quickly resume radio connection and quickly resume data service, a new Radio Resource Control (RRC) state, namely a radio resource control inactive (RRC_INACTIVE) state, is defined in a 5G network environment.

When a User Equipment (UE) is in the RRC_INACTIVE state, a network side configures a paging area of a Radio Access Network (RAN) for the UE. When the UE moves within the paging area, the network side is not notified, and a mobility behavior under RRC_IDLE, i.e., a cell selection and reselection principle, is followed. When the UE moves out of the paging area, the UE is triggered to resume a RRC connection and re-obtain a paging area configured by the network side.

When a cell signal is not good, the UE in the INACTIVE state may be unable to find a suitable cell to reside in, and the UE may enter an arbitrary cell search state or may choose an acceptable cell to reside in. It can be found that how to control a state and context of the UE and how to ensure that a UE's behavior is manageable and controllable is an urgent problem to be solved.

SUMMARY

A cell search method and a terminal device are provided.

In a first aspect, a cell search method is provided, which is applied to a terminal device in an inactive state, wherein the inactive state refers to that the terminal device is disconnected from a network device, and both the network device and the terminal device retain context information of the terminal device, wherein the context information is used for establishing a connection between the terminal device and the network device; the method includes that the terminal device enters an arbitrary cell search state to search for an acceptable cell and/or a suitable cell when the terminal device does not search out any suitable cell to reside in, wherein the acceptable cell is a cell in which the terminal device is capable of residing and only obtaining a restricted service, and the suitable cell is a cell in which the terminal device is capable of residing and obtaining a normal service.

In an embodiment of the present invention, when no suitable cell is searched out to reside in by a terminal device in the INACTIVE state, the terminal device searches for an acceptable cell and/or a suitable cell by entering an arbitrary cell search state.

In some possible implementations, the method further includes that when searching out the acceptable cell, the terminal device resides in the acceptable cell and continues to search for the suitable cell.

In some possible implementations, the method further includes that when entering the arbitrary cell search state, the terminal device starts a first timer; when the first timer expires and no suitable cell is searched out, the terminal device enters an idle state and deletes the context information; and when the first timer does not expire and the suitable cell is searched out, the terminal device stops the first timer and resides in the suitable cell.

In some possible implementations, before the terminal device starts the first timer, the method further includes that the terminal device receives configuration information sent by the network device, wherein the configuration information is used for the terminal device to configure the first timer.

In some possible implementations, the configuration information is information configured for the terminal device when the network device instructs the terminal device to enter the inactive state.

In some possible implementations, the method further includes that when entering the arbitrary cell search state, the terminal device enters the idle state and deletes the context information.

In some possible implementations, the method further includes that when entering the arbitrary cell search state, the terminal device continues to maintain the inactive state and a second timer, wherein the second timer includes a location update timer.

In some possible implementations, the method further includes that when the second timer expires, the terminal device enters the idle state and deletes the context information.

In some possible implementations, the method further includes that after entering the idle state and deleting the context information, the terminal device continues to maintain the arbitrary cell search state.

In the embodiment of the present invention, when no suitable cell is searched out to reside in by the terminal device in the INACTIVE state, the terminal device searches for an acceptable cell and/or a suitable cell by entering an arbitrary cell search state.

In a second aspect, a terminal device is provided, wherein the terminal device is in an inactive state, the inactive state refers to that the terminal device is disconnected from a network device, and both the network device and the terminal device retain context information of the terminal device, the context information is used for establishing a connection between the terminal device and the network device; the terminal device includes a processing unit.

Herein, the processing unit is configured to enter an arbitrary cell search state to search for an acceptable cell and/or a suitable cell when the terminal device does not search out any suitable cell to reside in, wherein the acceptable cell is a cell in which the terminal device is capable of residing and only obtaining a restricted service, and the suitable cell is a cell in which the terminal device is capable of residing and obtaining a normal service.

In a third aspect, a terminal device is provided, wherein the terminal device is in an inactive state, the inactive state refers to that the terminal device is disconnected from a network device, and both the network device and the terminal device retain context information of the terminal device, the context information is used for establishing a connection between the terminal device and the network device; the terminal device includes a processor.

Herein, the processor is configured to enter an arbitrary cell search state to search for an acceptable cell and/or a suitable cell when the terminal device does not search out any suitable cell to reside in, wherein the acceptable cell is a cell in which the terminal device is capable of residing and only obtaining a restricted service, and the suitable cell is a cell in which the terminal device is capable of residing and obtaining a normal service.

In a fourth aspect, a computer readable medium is provided for storing a computer program thereon. The computer program includes instructions used for performing the method implementation of the above first aspect.

In a fifth aspect, a computer chip is provided. The computer chip includes an input interface, an output interface, at least one processor, and a memory. The at least one processor is used for executing codes in the memory. When the codes are executed, the processor may implement various processes executed by the terminal device in the cell search method of the above first aspect and various implementations.

In a sixth aspect, a communication system is provided, which includes the above terminal device.

DETAILED DESCRIPTION

Implementations of the present disclosure may be applied to any communication system including a terminal device in an RRC_INACTIVE state. That is, the communication system 100 is only for exemplary description of the implementations of the present disclosure. However, the implementations of the present disclosure are not limited to it.

Technical solutions of implementations of the present disclosure may be applied to various communication systems, for example, a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, LTE Time Division Duplex (TDD), a Universal Mobile Telecommunication System (UMTS), 5G.

Herein, main application scenarios of 5G are Enhance Mobile Broadband (eMBB), Ultra-Reliable and Low Latency Communication (URLLC), and massive Machine Type of Communication (mMTC). The eMBB aims at users' obtaining multimedia contents, services and data. In addition, as the eMBB may be deployed in different scenarios, capabilities and requirements thereof are quite different, for example, indoor, urban, rural areas. Typical applications of the URLLC include industrial automation, power automation, telemedicine operation (surgery), traffic safety, etc. Typical characteristics of the mMTC include high connection density, small amount of data, latency insensitive services, low cost and long life of a module, etc.

The present disclosure describes various implementations in connection with a network device and a terminal device.

Herein, the network device may refer to any entity at a network side for sending or receiving signals. For example, the network device may be a user equipment of Machine Type Communication (MTC), a Base Transceiver Station (BTS) in GSM or CDMA, a NodeB in WCDMA, an Evolution Node B (eNB or NodeB) in LTE, a base station device in a 5G network, etc.

In addition, the terminal device may be any terminal device. Specifically, the terminal device may communicate with one or more core networks through a radio access network (RAN), and may be referred to as an access terminal, a User Equipment (UE), a subscriber unit, a subscriber station, a mobile station, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, and a terminal device in a 5G network, or the like.

Figure 1:
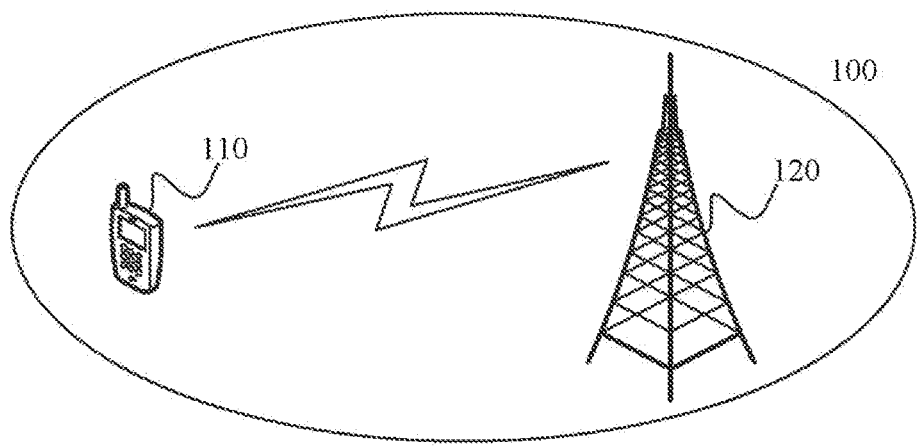
FIG. 1 is an example of a communication system according to an implementation of the present disclosure.

FIG. 1 is a schematic diagram of a communication system according to an implementation of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120. Herein, the terminal device 110 may be in an RRC_INACTIVE state.

The RRC_INACTIVE state is different from an RRC_IDLE state and an RRC_ACTIVE state.

To facilitate understanding of a solution, the following is a brief introduction to states of the terminal device.

In implementations of the present disclosure, states of the terminal device 110 may include an RRC_IDLE state, an RRC_ACTIVE state, and an RRC_INACTIVE state.

For the RRC_ACTIVE state, there is an RRC connection between the terminal device and the network device, the network device and the terminal device store context information of the terminal device. A location of the terminal device acquired by the network device is at a specific cell level, mobility of the terminal device is controlled by the network device. For the RRC_IDLE state, there is no RRC connection between the terminal device and the network device, and the network device does not store the context information of the terminal device. When the terminal device needs to be paged, a core network initiates paging, and the core network configures a paging area, and mobility of the terminal device is based on cell selection or cell reselection by the terminal device.

However, for the RRC_INACTIVE state, there is a connection between the core network (CN) and the network device, context information of the terminal device exists on a certain network device. Paging is triggered by a Radio Access Network (RAN), and the RAN manages paging areas of the RAN, that is, a location of the terminal device acquired by the network device is at a paging area level of the RAN, and mobility of the terminal device is based on cell selection or cell reselection by the terminal device. In other words, the terminal device in the RRC_INACTIVE state is disconnected from the network device, and the network device retains the context information of the terminal device, and the context information is used for quickly establishing a connection between the terminal device and the network device.

For example, assuming that a terminal device is in the RRC_INACTIVE state, a network device configures a paging area of the RAN for the terminal device, and the paging area of the RAN may include multiple cells. For convenience of description, in an implementation of the present disclosure, alternatively, the paging area of the RAN may be referred to as an initial paging area, or a paging area preconfigured for the terminal device by the network device may be referred to as the initial paging area. In other words, when performing cell reselection, the terminal device may be triggered to resume a RRC connection based on the initial paging area.

When a cell signal is not good, the UE in the INACTIVE state may be unable to find a suitable cell to reside in, and the UE may enter an arbitrary cell search state or may choose an acceptable cell to reside in. It can be found that how to control a state and context of the UE and how to ensure that a UE's behavior is manageable and controllable is an urgent problem to be solved.

To solve the above-mentioned problems, an implementation of the present disclosure provides a cell search method. When a cell signal is not good during a moving process of a UE in an INACTIVE state, by specifying a state and context information of the UE, it is ensured that the UE's behavior is manageable and controllable.

Figure 2:
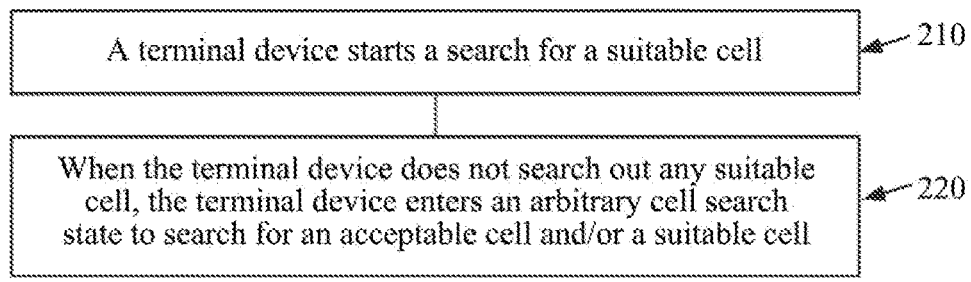
FIG. 2 is a schematic flowchart of a cell search method according to an implementation of the present disclosure.

FIG. 2 is a schematic flowchart of a method for a terminal device to search a cell according to an implementation of the present disclosure.

It should be understood that the method for a terminal device to select a cell in the implementation of the present disclosure may be applied to the terminal device in an inactive state. The inactive state refers to that the terminal device is disconnected form a network device, and both the network device and the terminal device retain context information of the terminal device, wherein the context information is used for establishing a connection between the terminal device and the network device.

As shown in FIG. 2, the method includes acts 210-220.

In 210, a terminal device starts a search for a suitable cell.

In 220, when the terminal device does not search out any suitable cell, the terminal device enters an arbitrary cell search state to search for an acceptable cell and/or a suitable cell, wherein the acceptable cell is a cell in which the terminal device is capable of residing and only obtaining a restricted service, and the suitable cell is a cell in which the terminal device is capable of residing and obtaining a normal service.

In addition, service types and cell classifications under the RRC_IDLE state are explained below.

In an implementation of the present disclosure, the service types in the RRC_IDLE state include but are not limited to the following single service types: a restricted service, a normal service, and an operating personnel service.

Restricted service: it means an emergency call made in an acceptable cell.

Normal service: it means normal use in a suitable cell.

Operating personnel service: it is used by operating personnel on a reserved cell.

Implementations of the present disclosure include but are not limited to the following cell types according to services provided.

Acceptable cell: restricted service (Emergency Call) is available in the acceptable cell.

Suitable cell: UE can reside and obtain normal services in the suitable cell.

Barred cell: the barred cell is a cell indicated as barred in system information.

Reserved cell: the reserved cell is a cell indicated as reserved in system information.

Cell selection generally occurs after Public Land Mobile Network (PLMN) selection, and its purpose is to enable a UE to select a cell whose channel quality meets a condition to reside in as soon as possible after powered on. Cell selection mainly includes two types.

Further, when the terminal device searches out the acceptable cell, the terminal device resides in the acceptable cell and continues to search for the suitable cell.

In the implementation of the present disclosure, when no suitable cell is searched out to reside in by a terminal device in the INACTIVE state, the terminal device may search for an acceptable cell and/or a suitable cell by entering an arbitrary cell search state, such that an existing protocol framework can be applied as much as possible, and the applicability is increased.

Furthermore, by specifying a state and context information of the UE, it can be ensured that a UE's behavior is manageable and controllable.

A processing mode for a state and context information of the UE when the terminal device enters an arbitrary cell search state in the implementation of the present disclosure is exemplarily explained below.

In one implementation, when entering the arbitrary cell search state, the terminal device starts a first timer; when the first timer expires and no suitable cell is searched out, the terminal device enters an idle state and deletes the context information; when the first timer does not expire and the suitable cell is searched out, the terminal device stops the first timer and resides in the suitable cell.

Further, before the terminal device starts the first timer, the terminal device receives configuration information sent by the network device, wherein the configuration information is used for the terminal device to configure the first timer.

For example, the configuration information is information configured for the terminal device when the network device instructs the terminal device to enter the inactive state.

In another implementation, when entering the arbitrary cell search state, the terminal device may directly enter the idle state and delete the context information.

In another implementation, when entering the arbitrary cell search state, the terminal device continues to maintain the inactive state and a second timer, wherein the second timer includes a location update timer.

Further, when the second timer expires, the terminal device enters the idle state and deletes the context information.

It should be understood that in the implementation of the present disclosure, after the terminal device enters the idle state and deletes the context information, the terminal device may further continue to maintain the arbitrary cell search state.

It should further be understood that, when the terminal device enters the arbitrary cell search state in the implementation of the present disclosure, the processing mode for the state and the context information of the UE is only an exemplary description, and implementations of the present disclosure are not limited to this.

For example, the terminal device may determine a specific processing mode according to a user requirement.

Figure 3:
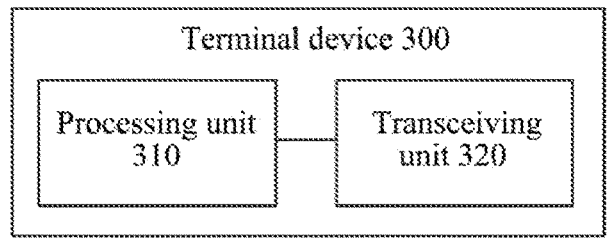
FIG. 3 is a schematic block diagram of a terminal device according to an implementation of the present disclosure.

FIG. 3 is a schematic block diagram of a terminal device 300 according to an implementation of the present disclosure. It should be understood that the terminal device is in an inactive state, wherein the inactive state refers to that the terminal device is disconnected from a network device, both the network device and the terminal device retain context information of the terminal device, and the context information is used for establishing a connection between the terminal device and the network device.

As shown in FIG. 3, the terminal device 300 includes a processing unit 310.

The processing unit 310 is configured to, when the terminal device does not search out any suitable cell to reside in, enter an arbitrary cell search state to search for an acceptable cell and/or a suitable cell, wherein the acceptable cell is a cell in which the terminal device is capable of residing and only obtaining a restricted service, and the suitable cell is a cell in which the terminal device is capable of residing and obtaining a normal service.

Optionally, the processing unit 310 is further configured to, when the terminal device searches out the acceptable cell, reside in the acceptable cell and continue to search for the suitable cell.

Optionally, the processing unit 310 is further configured to start a first timer when the terminal device enters the arbitrary cell search state; when the first timer expires and no suitable cell is searched out, enter an idle state and delete the context information; when the first timer does not expire and the suitable cell is searched out, stop the first timer and reside in the suitable cell.

Optionally, the terminal device further includes a transceiving unit 320.

The transceiving unit 320 is configured to receive configuration information sent by a network device before the processing unit 310 starts the first timer, wherein the configuration information is used for the terminal device to configure the first timer.

Optionally, the configuration information is information configured for the terminal device when the network device instructs the terminal device to enter the inactive state.

Optionally, the processing unit 310 is further configured to, when the terminal device enters the arbitrary cell search state, enter the idle state and delete the context information.

Optionally, the processing unit 310 is further configured to, when the terminal device enters the arbitrary cell search state, continue to maintain the inactive state and a second timer, wherein the second timer includes a location update timer.

Optionally, the processing unit 310 is further configured to, when the second timer expires, enter the idle state and delete the context information.

Optionally, the processing unit 310 is further configured to, after the terminal device enters the idle state and deletes the context information, continue to maintain the arbitrary cell search state.

Figure 4:
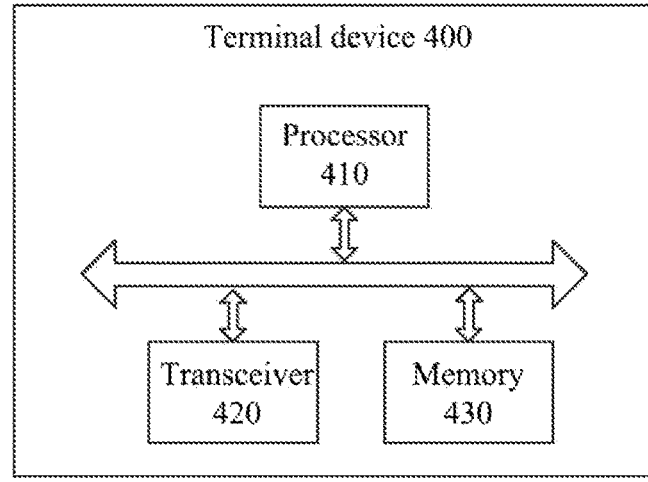
FIG. 4 is another schematic block diagram of a terminal device according to an implementation of the present disclosure.

In the implementation of the present disclosure, the processing unit 310 may be implemented by a processor, and the transceiving unit 320 may be implemented by a transceiver. As shown in FIG. 4, a terminal device 400 may include a processor 410, a transceiver 420, and a memory 430. The memory 430 may be used for storing indication information, or may be used for storing codes, instructions, etc., executed by the processor 410. The various components in the terminal device 400 are connected by a bus system. The bus system includes a power bus, a control bus and a status signal bus in addition to a data bus.

The terminal device 400 shown in FIG. 4 can implement various processes implemented by the terminal device in the method implementations described above. For avoiding duplication, the details will not be repeated herein. That is, the method implementations in implementations of the present disclosure may be applied to a processor or implemented by the processor.

Specifically, in an implementation process, each act of the method implementations in the implementations of the present disclosure may be implemented by an integrated logic circuit of hardware in the processor or an instruction in the form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads the information in the memory and completes the acts of the above method in combination with its hardware.

Herein, the processor may be an integrated circuit chip with a capability of processing signals, and may implement various methods, acts and logic block diagrams disclosed in the implementations of the present disclosure. For example, the above processor may be a general purpose processor, a digital signal processor (DSP), an application specific integrated circuit (ASIC), a field programmable gate array (FPGA) or other programmable logic devices, a transistor logic device, or a discrete hardware component, or the like. Furthermore, the general purpose processor may be a microprocessor or the processor may be any conventional processor or the like.

In addition, the memory in implementations of the present disclosure may be a transitory memory or non-transitory memory, or may include both the transitory memory and the non-transitory memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. It should be understood that, the foregoing memory is an example for illustration and should not be construed as limiting. For example, optionally, the memory in the implementations of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a/an", "said", and "the" used in implementations of the present disclosure and the appended claims are intended to include the plural forms unless the context clearly represents other meanings.

For another example, depending on the context, word "when" as used herein may be interpreted as "if" or "whether" or "while" or "in response to a determination of/that" or "in response to a detection of/that". Similarly, depending on the context, the phrase "if determined" or "if detected (a stated condition or event)" may be interpreted as "when . . . is determined" or "in response to a determination" or "when (stated condition or event) is detected" or "in response to a detection of (stated condition or event)".

Those of ordinary skill in the art will recognize that the exemplary elements and algorithm acts described in combination with the implementations disclosed herein can be implemented in electronic hardware, or a combination of computer software and electronic hardware. Whether these functions are implemented in hardware or software depends on specific applications and design constraints of technical solutions. One skilled in the art may use different methods to implement the described functions for each specific application, but such implementation should not be considered to be beyond the scope of implementations of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, devices and methods may be implemented in other ways. For example, the device implementations described above are only illustrative, for example, the division of the units is only a logical function division, and there may be other division modes in actual implementations, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a magnetic disk or an optical disk.

What are described above are merely the specific implementations of the implementations of the present disclosure, but the protection scope of the implementations of the present disclosure is not limited thereto. Any change or substation that can be easily conceived by any one skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

What is claimed is:

1. A cell search method, comprising:
searching, by a terminal device, a cell to reside, wherein the terminal device is in an inactive state, wherein the inactive state refers to that the terminal device is disconnected from a network device, and both the network device and the terminal device retain context information of the terminal device, wherein the context information is used for establishing a connection between the terminal device and the network device;
entering, by the terminal device, an arbitrary cell search state to search for an acceptable cell and/or a suitable cell when the terminal device does not find any suitable cell to reside in, wherein the acceptable cell is a cell in which the terminal device is capable of residing and only obtaining a restricted service, and the suitable cell is a cell in which the terminal device is capable of residing and obtaining a normal service; and
continuing to maintain, by the terminal device, the inactive state and a second timer when entering the arbitrary cell search state, wherein the second timer comprises a location update timer.

2. The method of claim 1, further comprising:
when the acceptable cell is found, residing, by the terminal device, in the acceptable cell, and continuing to search for the suitable cell.

3. The method of claim 2, further comprising:
when entering the arbitrary cell search state, starting, by the terminal device, a first timer;
when no suitable cell is found before the first timer expires, entering, by the terminal device, an idle state and deleting the context information; or
when the suitable cell is found before the first timer expires, stopping, by the terminal device, the first timer and residing in the suitable cell.

4. The method of claim 2, further comprising:
when entering the arbitrary cell search state, entering, by the terminal device, an idle state and deleting the context information.

5. The method of claim 2, further comprising:
when entering the arbitrary cell search state, continuing to maintain, by the terminal device, the inactive state and a second timer, wherein the second timer comprises a location update timer.

6. The method of claim 1, further comprising:
when entering the arbitrary cell search state, starting, by the terminal device, a first timer;
when no suitable cell is found before the first timer expires, entering, by the terminal device, an idle state and deleting the context information; or,
when the suitable cell is found before the first timer expires, stopping, by the terminal device, the first timer and residing in the suitable cell.

7. The method of claim 6, further comprising:
before starting the first timer, receiving, by the terminal device, configuration information sent by the network device, wherein the configuration information is used for the terminal device to configure the first timer.

8. The method of claim 7, wherein the configuration information is information configured for the terminal device when the network device instructs the terminal device to enter the inactive state.

9. The method of claim 8, further comprising:
after entering the idle state and deleting the context information, continuing to maintain, by the terminal device, the arbitrary cell search state.

10. The method of claim 7, further comprising:
after entering the idle state and deleting the context information, continuing to maintain, by the terminal device, the arbitrary cell search state.

11. The method of claim 6, further comprising:
after entering the idle state and deleting the context information, continuing to maintain, by the terminal device, the arbitrary cell search state.

12. The method of claim 1, further comprising:
when entering the arbitrary cell search state, entering, by the terminal device, an idle state and deleting the context information.

13. The method of claim 12, further comprising:
after entering the idle state and deleting the context information, continuing to maintain, by the terminal device, the arbitrary cell search state.

14. The method of claim 1, further comprising:
when the second timer expires, entering, by the terminal device, an idle state and deleting the context information.

15. A terminal device, comprising a processor, wherein the processor is configured to search a cell to reside, wherein the terminal device is in an inactive state, wherein the inactive state refers to that the terminal device is disconnected from a network device, and both the network device and the terminal device retain context information of the terminal device, wherein the context information is used for establishing a connection between the terminal device and the network device;
enter an arbitrary cell search state to search for an acceptable cell and/or a suitable cell when the terminal device does not find any suitable cell to reside in, wherein the acceptable cell is a cell in which the terminal device is capable of residing and only obtaining a restricted service, and the suitable cell is a cell in which the terminal device is capable of residing and obtaining a normal service; and
continue to maintain the inactive state and a second timer when entering the arbitrary cell search state, wherein the second timer comprises a location update timer.

16. The terminal device of claim 15, wherein the processor is further configured to, when the acceptable cell is found, reside in the acceptable cell, and continue to search for the suitable cell.

17. The terminal device of claim 16, wherein the processor is further configured to:
start a first timer when the terminal device enters the arbitrary cell search state;
when no suitable cell is found before the first timer expires, enter an idle state and delete the context information; or
when the suitable cell is found before the first timer expires, stop the first timer and reside in the suitable cell.

18. The terminal device of claim 16, wherein the processor is further configured to:
when the terminal device enters the arbitrary cell search state, enter an idle state and delete the context information.

19. The terminal device of claim 16, wherein the processor is further configured to:
when the terminal device enters the arbitrary cell search state, continue to maintain the inactive state and a second timer, wherein the second timer comprises a location update timer.

20. The terminal device of claim 15, wherein the processor is further configured to:
start a first timer when the terminal device enters the arbitrary cell search state;
when no suitable cell is found before the first timer expires, enter an idle state and delete the context information; or
when the suitable cell is found before the first timer expires, stop the first timer and reside in the suitable cell.

21. The terminal device of claim 20, further comprising a transceiver, wherein
the transceiver is configured to receive configuration information sent by the network device before the processor starts the first timer, wherein the configuration information is used for the terminal device to configure the first timer.

22. The terminal device of claim 21, wherein the configuration information is information configured for the terminal device when the network device instructs the terminal device to enter the inactive state.

23. The terminal device of claim 22, wherein the processor is further configured to:
after the terminal device enters the idle state and deletes the context information, continue to maintain the arbitrary cell search state.

24. The terminal device of claim 21, wherein the processor is further configured to:
after the terminal device enters the idle state and deletes the context information, continue to maintain the arbitrary cell search state.

25. The terminal device of claim 15, wherein the processor is further configured to:
when the terminal device enters the arbitrary cell search state, enter an idle state and delete the context information.

26. The terminal device of claim 20, wherein the processor is further configured to:
after the terminal device enters the idle state and deletes the context information, continue to maintain the arbitrary cell search state.

27. The terminal device of claim 25, wherein the processor is further configured to:
after the terminal device enters the idle state and deletes the context information, continue to maintain the arbitrary cell search state.

28. The terminal device of claim 15, wherein the processor is further configured to:
when the second timer expires, enter an idle state and delete the context information.

* * * * *